(12) United States Patent
Ren et al.

(10) Patent No.: US 10,041,807 B2
(45) Date of Patent: Aug. 7, 2018

(54) STYLIZED PROCEDURAL MODELING FOR 3D NAVIGATION

(71) Applicant: Robert Bosch GmbH, Stuttgart (DE)

(72) Inventors: Liu Ren, Cupertino, CA (US);
Zhicheng Yan, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 495 days.

(21) Appl. No.: 13/953,138

(22) Filed: Jul. 29, 2013

(65) Prior Publication Data

US 2013/0317738 A1    Nov. 28, 2013

Related U.S. Application Data

(63) Continuation of application No. 12/652,594, filed on Jan. 5, 2010, now Pat. No. 8,498,812.

(51) Int. Cl.
*G01C 21/30* (2006.01)
*G01C 21/36* (2006.01)
*G06T 17/05* (2011.01)

(52) U.S. Cl.
CPC ..... *G01C 21/3667* (2013.01); *G01C 21/3638* (2013.01); *G06T 17/05* (2013.01)

(58) Field of Classification Search
CPC ................................................ G01C 21/3638
See application file for complete search history.

(56) References Cited

U.S. PATENT DOCUMENTS

| 5,908,465 | A  | * | 6/1999 | Ito ...................... | G01C 21/3614 340/995.27 |
| 6,201,544 | B1 | * | 3/2001 | Ezaki ................. | G01C 21/3638 345/419 |
| 6,871,143 | B2 | * | 3/2005 | Fujiwara ............ | G01C 21/3638 340/995.24 |
| 7,064,761 | B2 | * | 6/2006 | Grassia ................... | G06T 13/00 345/473 |
| 7,570,261 | B1 | * | 8/2009 | Edecker ............... | G06Q 20/102 345/420 |
| 7,865,302 | B2 | * | 1/2011 | Hatazawa .......... | G01C 21/3673 701/426 |

(Continued)

FOREIGN PATENT DOCUMENTS

| DE | 102006013299 A1 | 9/2007 |
| EP | 1855263 A1 | 11/2007 |

(Continued)

OTHER PUBLICATIONS

Communication corresponding to European Patent Application No. 12 192 780.0 (7 pages).

(Continued)

*Primary Examiner* — Nicholas Kiswanto
(74) *Attorney, Agent, or Firm* — Maginot Moore & Beck LLP

(57) ABSTRACT

A method of displaying a navigation map includes determining a route of a vehicle. A two-dimensional footprint of a building disposed within a geographic area is received within the vehicle. The geographic area includes the route of the vehicle. Attribute information associated with the building is received. The attribute information is received within the vehicle. A visual representation of the building is rendered based upon the two-dimensional footprint and the attribute information.

7 Claims, 11 Drawing Sheets

(56) References Cited

U.S. PATENT DOCUMENTS

| | | | |
|---|---|---|---|
| 8,244,569 B2* | 8/2012 | Seppanen | G06Q 50/08 52/236.1 |
| 8,265,865 B2* | 9/2012 | Faenger | G01C 21/367 701/409 |
| 2006/0238383 A1* | 10/2006 | Kimchi | G06F 17/30241 340/995.1 |
| 2008/0319655 A1* | 12/2008 | Vande Velde | G01C 21/32 701/532 |
| 2009/0046093 A1 | 2/2009 | Kikuchi et al. | |
| 2010/0097241 A1* | 4/2010 | Suddreth | G01C 23/00 340/972 |
| 2010/0110074 A1* | 5/2010 | Pershing | G06F 17/5004 345/423 |
| 2010/0241628 A1* | 9/2010 | Levanon | G06Q 30/02 707/741 |
| 2011/0025531 A1 | 2/2011 | Geelen et al. | |
| 2011/0144909 A1 | 6/2011 | Ren et al. | |
| 2013/0321257 A1* | 12/2013 | Moore | G06F 3/0481 345/156 |
| 2014/0368507 A1* | 12/2014 | Altman | G06T 17/05 345/426 |

FOREIGN PATENT DOCUMENTS

| | | |
|---|---|---|
| JP | 2001027534 A | 1/2001 |
| JP | 2008123319 A | 5/2008 |
| WO | 2009143869 A1 | 12/2009 |

OTHER PUBLICATIONS

Decision to Refuse a European Patent Application corresponding to European Patent Application No. 11 150 217.5 (18 pages).

\* cited by examiner

STYLIZED PROCEDURAL MODELING FOR 3D NAVIGATION

BACKGROUND OF THE INVENTION

1. Field of the Invention

The present invention relates to electronic navigation maps, and, more particularly, to rendering images for electronic navigation maps.

2. Description of the Related Art

Navigation maps are essential resources for visitors to an unfamiliar city because these maps visually highlight landmarks including buildings, natural features, and points of interest such as museums, restaurants, parks and shopping districts. While most in-car and portable navigation devices (PNDs) rely on two-dimensional (2D) navigation maps to visualize these landmarks in 2D, three-dimensional (3D) in-car navigation systems are emerging.

Using a 3D map for navigation can provide a lot of benefits. For example, a 3D map can provide better driver orientation than a 2D map because people live in a 3D world. A 3D map can also improve landmark recognition as the important features (e.g., geometry, structures, textures) of 3D buildings/landmarks can be fully exposed so that it will be a lot easier for a user to match these features with what he could see through the windshield. However, introducing 3D in a navigation map also brings in typical 3D occlusion problems, which could negatively impact the visibility of route guidance for navigation.

A 3D navigation system allows drivers to locate point of interests (POIs) and set up routes in a 3D environment. However, high geometric complexity of scene buildings and the required 3D rendering efforts may affect the performance of such systems on embedded platforms. On one hand, complete data of 3D buildings with highly detailed structures are not yet available everywhere from data providers. In most cases, these highly detailed data (e.g., complex geometry, texture) are available for only a few outstanding landmarks (e.g., museums, tower) in cities or urban areas. The available information for most non-landmark buildings in these areas may include only some simple geometry information such as 2D footprint, the height of the building, and some descriptions for building types. The lack of detailed 3D geometry and building textures presents a great challenge for visualization in 3D navigation. It is possible to simply lift up a building from its 2D footprint according to the height of the building. This 2.5D approach was widely adopted in most commercial 3D navigation systems, an example of which is shown in FIG. 1. As can be seen in FIG. 1, such a building presentation (i.e., 2.5D lifting, no texture information) does not distinguish buildings with different types and therefore cannot improve building/landmark recognition or 3D orientation for the driver. On the other hand, rendering highly detailed city models may be limited by the available 3D computation resources provided by embedded hardware platforms for cars. In summary, the 2.5D approach can successfully handle the missing data problem by presenting city models with low details. However, the cost is that such a building presentation fails to convey sufficient information for navigation.

A photorealistic 3D Map with high details can present a vivid and realistic scene to drivers, an example of which is shown in FIG. 2. These maps try to faithfully visualize the structure, geometry and texture of every object in a 3D scene. However, it could be problematic to use such a building presentation for 3D navigation. For example, this presentation may overwhelm drivers with too many details. In other words, it could significantly increase the cognitive load on the user during driving, distract the driver's attention, and fail to convey important information to the driver.

Previous work on procedural modelling of buildings focuses on creating an urban environment with a large number of 3D buildings. CGA shape, a novel shape grammar, is used to iteratively produce more geometric details from a simple mass model, as described in "Procedural Modeling of Buildings" by P. Mueller, P. Wonka, S. Haegler, A. Ulmer, and L. V. Gool, *Proceedings of ACM SIGGRAPH 2006*, which is hereby incorporated by reference herein in its entirety. These works aim to generate buildings with complex structure and rich details. For example, in a typical urban scene, the number of polygons used in 3D buildings can reach one billion. However, for navigation applications, these approaches cannot be used for several reasons. First, the computation cost of the modelling process is too expensive. Generating one 3D building with high complexity (e.g., between one thousand and one hundred thousand polygons) takes about one to three seconds, which may not meet the speed requirement for on-line modelling for large-scale urban scenes in a 3D navigation. Second, the memory footprints for these highly detailed 3D buildings are too large for typical embedded platforms which usually have very limited memory capacity. Finally, although the subtle details of these 3D building are generated based on architecture principles, they are more likely to deviate a lot from a building's actual appearance. Drivers tend to take these random details as reference and try to match them with those from actual buildings. Therefore, these random and fake details distract users' attention from navigation without providing useful guidance. FIG. 5a illustrates such a building with such random details.

What is neither disclosed nor suggested by the prior art is a method for presenting 3D landmarks and other 3D objects on a navigation map that overcomes the problems and disadvantages described above.

SUMMARY OF THE INVENTION

The present invention may provide an on-line procedural modelling approach to visualize buildings in a large-scale urban scene in a stylized way. Based on this approach, 3D buildings can be generated automatically and rapidly, even with only the limited building information provided from data providers. The generated 3D buildings feature moderate geometric complexity and illustrative styles, and may convey important details of the 3D building to the driver for 3D navigation. Furthermore, the stylized 3D presentations of these buildings may visualize the buildings' attributes (e.g., building type such as hospital, church, railway stations, etc.) for the driver. This approach may use only the 2D footprint and attributes of the 3D building as input and perform fast 3D modelling on-line, which may substantially reduce the demand for 3D data storage. The approach of the invention may also be adaptive. For example, the complexity level of resultant 3D buildings may be adjustable in order to achieve better run-time performance for different hardware platforms.

To overcome the difficulties of the prior art, the present invention may take advantage of procedural modelling and adapt it to the navigation domain. Procedural modelling is described in "Procedural Modeling of Cities" by Y. I. H. Parish and P. Mueller, *Proceedings of ACM SIGGRAPH 2001*, which is hereby incorporated by reference herein in its entirety. The novel procedural modelling approach of the present invention may generate stylized buildings in real time. The 3D objects may be visualized in an illustrative way such that only important information is conveyed to the driver. This approach is effective and suitable for navigation purposes. Illustrated in FIGS. 3 and 4 are examples of the results of the approach of the present invention used in a 3D navigation prototype system.

The invention comprises, in one form thereof, a method of displaying a navigation map including determining a route of a vehicle. A two-dimensional footprint of a building disposed within a geographic area is received within the vehicle. The geographic area includes the route of the vehicle. Attribute information associated with the building is received. The attribute information is received within the vehicle. A visual representation of the building is rendered based upon the two-dimensional footprint and the attribute information.

The invention comprises, in another form thereof, a method of displaying a navigation map including determining a route of a vehicle. Geographical coordinates of a location of the vehicle are received. A geographic area in which the geographical coordinates are disposed is determined. Data associated with buildings that are disposed within the geographic area is received. The geographic area includes the route of the vehicle. The data includes building types and building heights. Each of the buildings is rendered based upon the geographic area in which the building is disposed, the building's type, the building's three-dimensional shape, and the building's height.

The invention comprises, in yet another form thereof, a method of displaying a navigation map including determining a route of a vehicle. A two-dimensional footprint of a building that is disposed within a geographic area is received within the vehicle. The geographic area includes the route of the vehicle. The two-dimensional footprint is decomposed into tractable parts. Geometry information associated with the building is received within the vehicle. Each of the tractable parts is modeled separately in combination with a respective portion of the geometry information associated with each of the tractable parts. A visual representation of the building is rendered based upon a combination of the modelings of each of the tractable parts.

An advantage of the present invention is that the type of building that is rendered may be easily recognized by the viewer due to the common coloring and texturing, and yet the distinctive details of individual buildings are still preserved in the renderings.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 6b is an example of a decomposition of the footprint of FIG. 6a.

FIG. 6c is an example of building geometry consistent with the footprint of FIG. 6a.

FIG. 7b is another example of adaptive stylized procedural modeling of a building generated from the same 2D footprint as in FIG. 7a, but having a less complicated geometric structure for the roof as compared to FIG. 7a.

Figure 1:
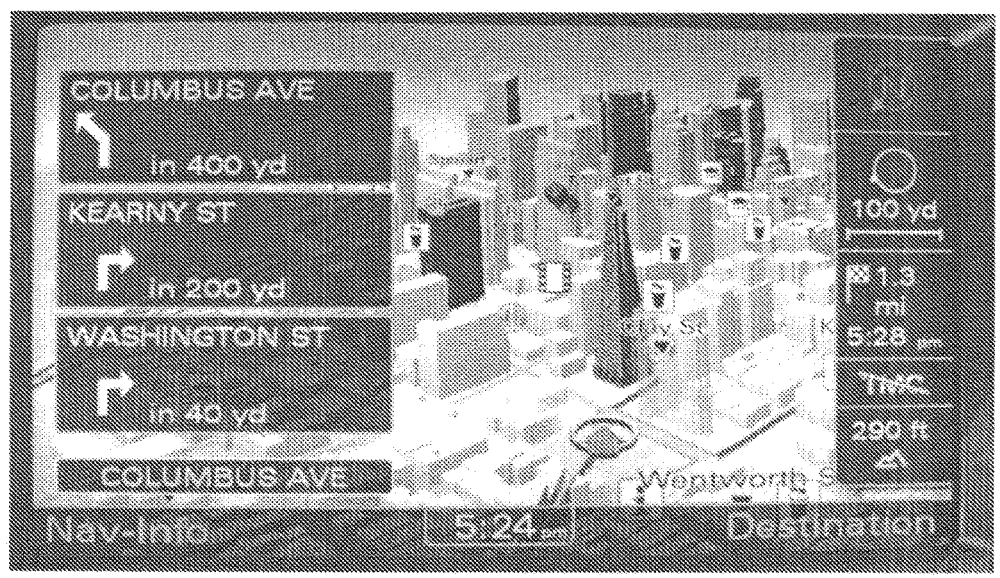
FIG. 1 is an example of a 2.5D presentation for non-landmark buildings in a 3D navigation system of the prior art.
Figure 2:
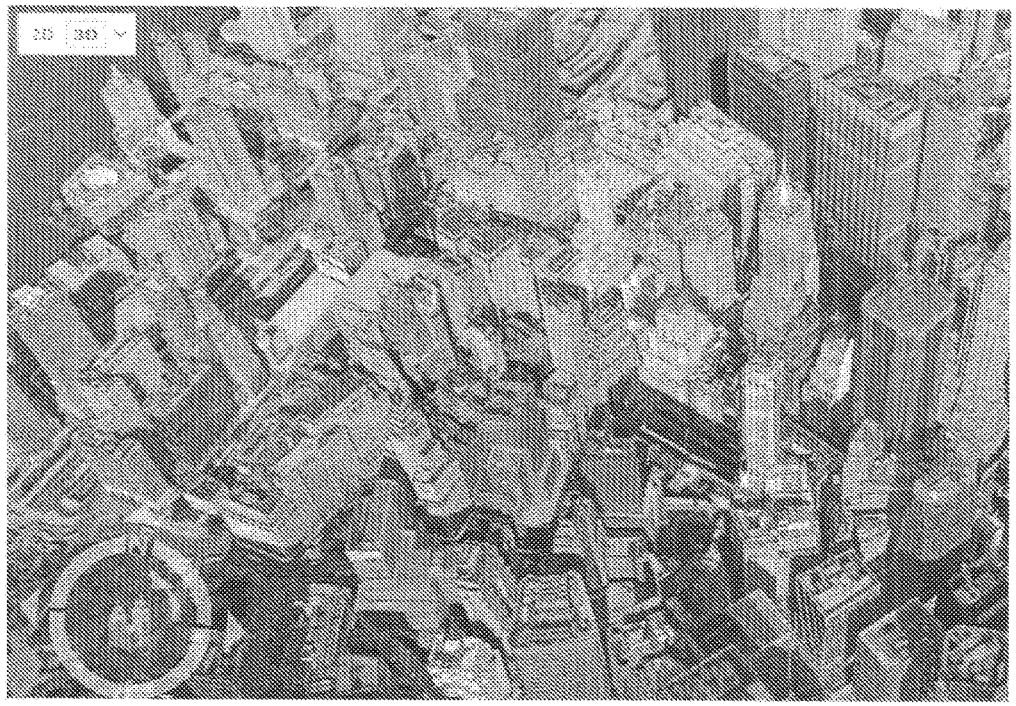
FIG. 2 is an example of a photorealistic 3D map according to the prior art.
Figure 3:
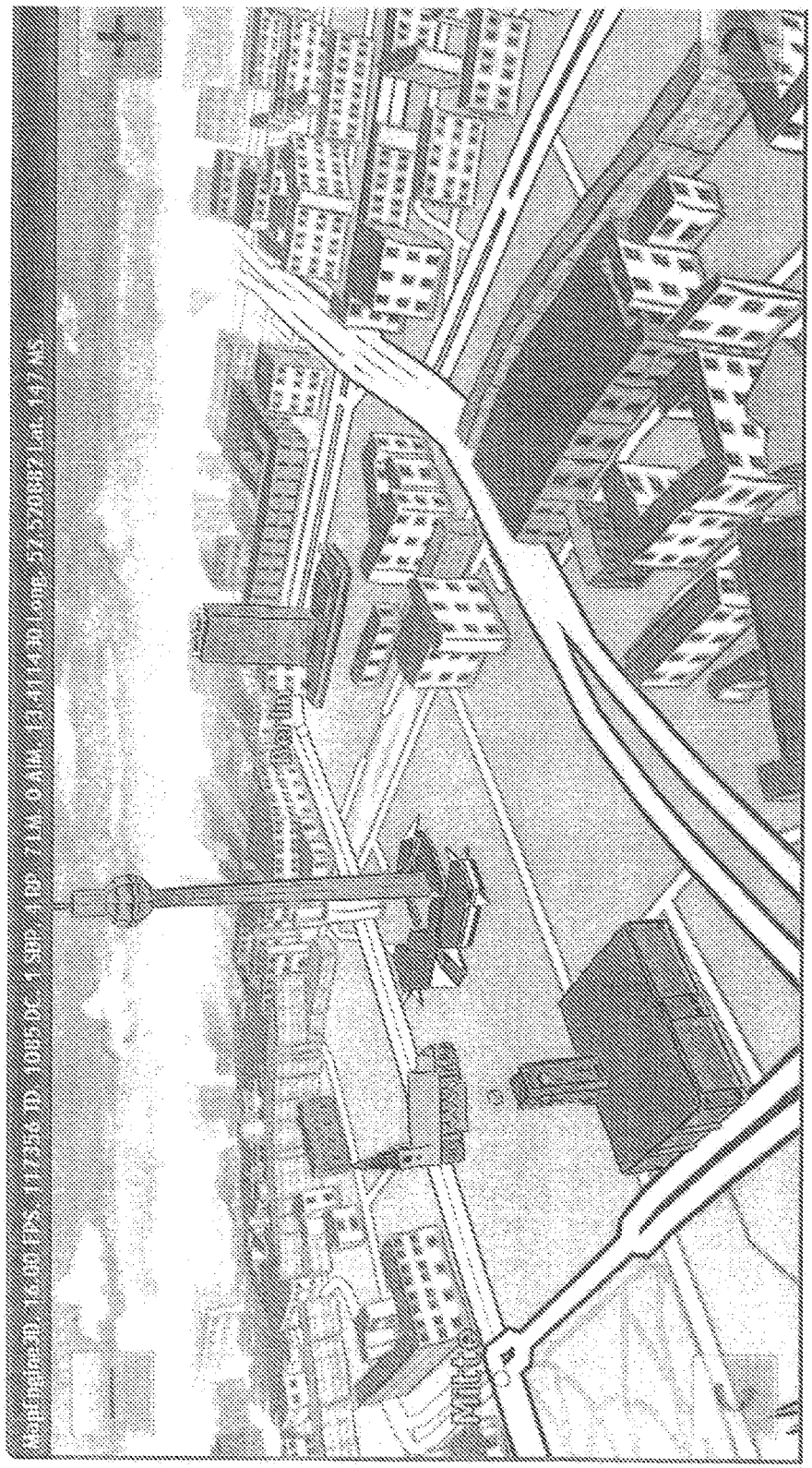
FIG. 3 is one example of an NPR 3D map rendering in which a stylized procedural modeling approach of the present invention is used to generate non-landmark building for a 3D navigation prototype system.
Figure 4:
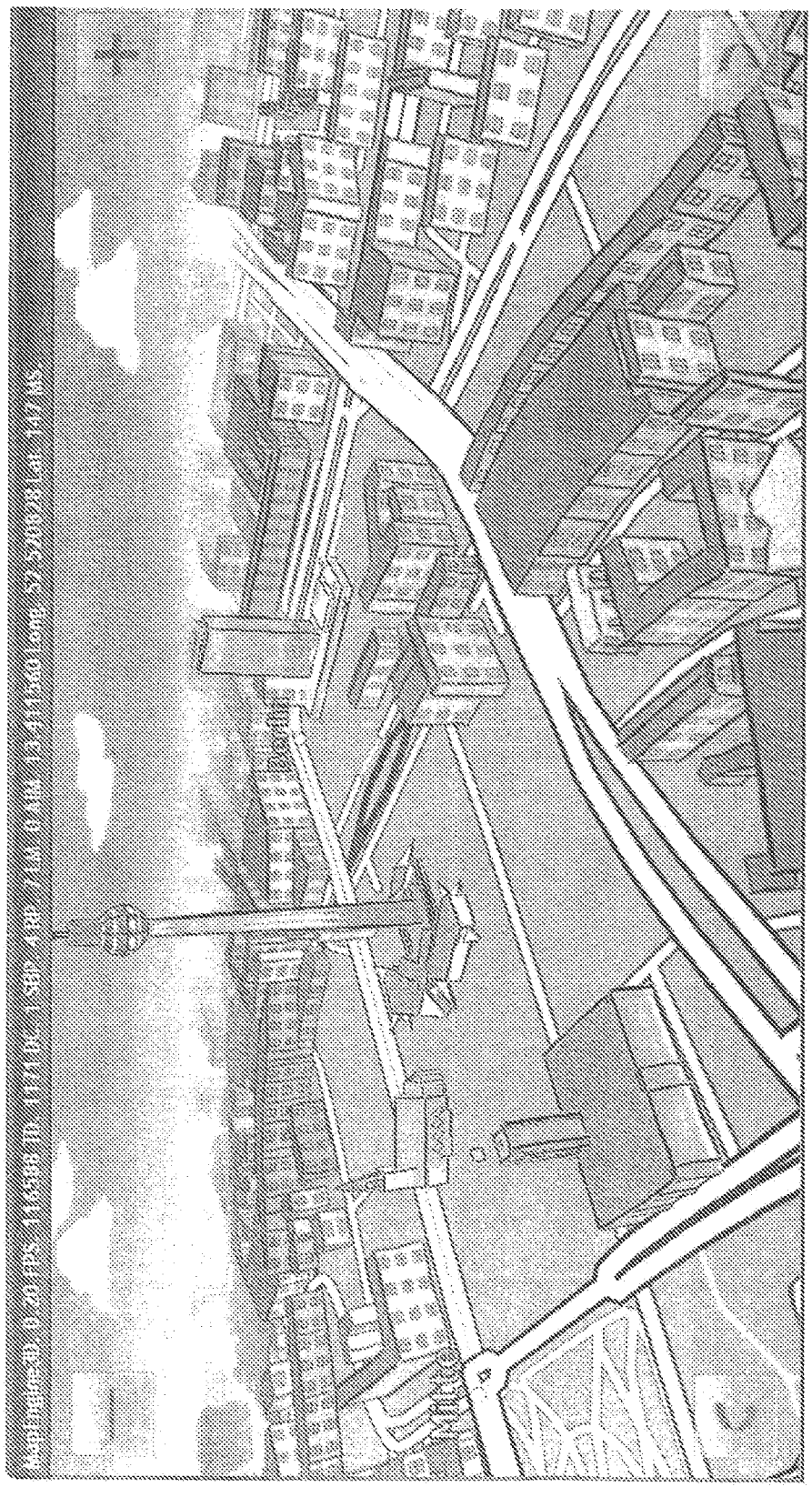
FIG. 4 is another example of an NPR 3D map rendering that may be produced by a method of the present invention in which non-landmark buildings are generated with styles different than in the rendering of FIG. 3.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The invention may provide a method of 3D navigation using NPR 3D maps, including stylized visualization for the 3D objects in a navigation map. The 3D objects displayed on a 3D navigation map may include buildings, landmarks, POIs, hazard spots, and roads. The NPR 3D maps may be created based on 3D object data that may be generated in different ways.

According to one embodiment of the method of the present invention, only a small amount information about 3D buildings (e.g., a building's 2D footprint, building height, utility type) may be stored in the storage media. For on-line processing, these 3D models may be generated with moderate geometric complexity and stylized texture decoration in real time. The generated 3D buildings may have distinguishable styles. Although the buildings may have variations on geometry, the structure and appearance (e.g., texture, color) may be generated consistently based on the attributes of buildings. For example, the churches in FIGS. 5b and 5c have different footprints and roof geometries, but their appearances (i.e., greenish roof, doors with cross-like decorations) are designed to covey the most important information for a church that is located in a certain area (e.g., Berlin in Germany) to the driver. In other words, each of these non-landmark buildings is visualized using an enhanced "3D icon"-like approach. The buildings of the same type may share the same visual appearance (e.g., color, texture, etc.). However, buildings of the same type may be presented with different 3D shapes and heights, which may also emphasize the important details for each individual building for the driver. Moreover, the common appearance of the type of buildings may be different in different geographical areas. This may be because the real-life representative style/appearance for each type of non-landmark buildings could be different in different geographical areas (e.g., a city, a state, or a country). Thus, an in-vehicle GPS may provide the navigation system with the real-time location of the vehicle, and this location data may be used in determining how certain types of buildings are rendered. That is, the rendering of certain types of buildings may be dependent upon real-time geographic location data that may be received from a GPS within the vehicle.

Figure 5D:
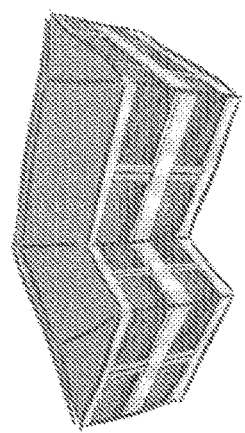
FIG. 5d is another example of stylized procedural modeling for a parking garage building.
Figure 5C:
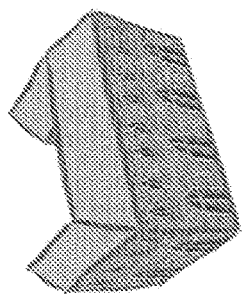
FIG. 5c is another example of a stylized building presentation with a different footprint than in FIG. 5b, which represents the building's real-life footprint.
Figure 5B:
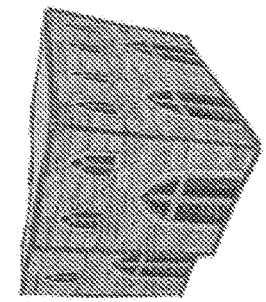
FIG. 5b is an example of a stylized building presentation that conveys important information about the building, such as building type.
Figure 5A:
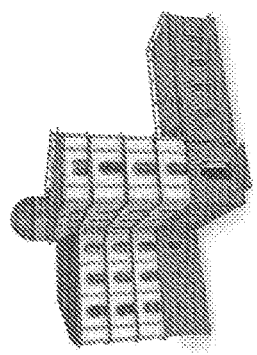
FIG. 5a is an example of a building with random details that may distract a user's attention from navigation.

The stylized procedural modeling may be consistent, as illustrated in FIGS. 5b and 5c. For example, all buildings of the same type (e.g., church) may be visualized in a similar way in a typical given city, area, state or country. Therefore, each of these non-landmark buildings may be visualized as a 3D icon that presents the most important information to the driver (e.g., shape, height and type). FIG. 5d illustrates another example of stylized procedural modeling of a car parking building.

Figure 6A:
FIG. 6a is an example of a building's 2D footprint, which may include attribute information such as building type.
Figure 6C:
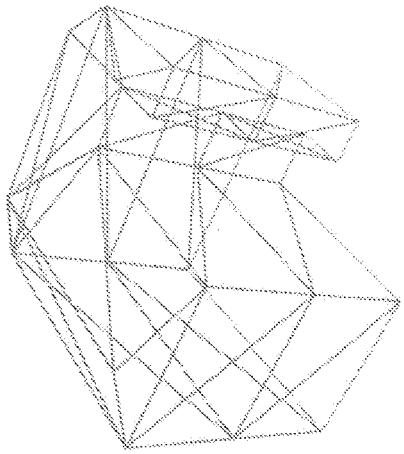
Figure 6D:
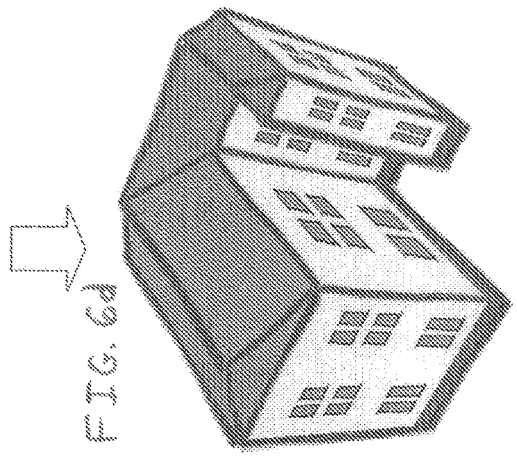
FIG. 6d is an example of a stylized 3D building resulting from a combination of all individual 3D components.
Figure 6B:
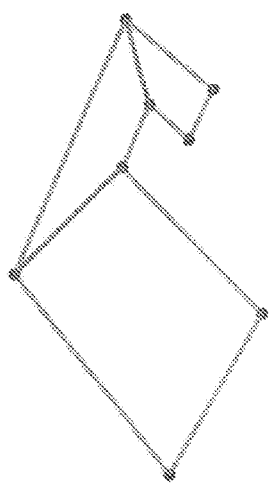

Another feature of the stylized procedural modelling of the present invention may be decomposing an input irregular footprint into tractable parts. The tractable parts may be the basic units of a footprint from an architecture point of view. For example, a tractable part could be a convex quadrilateral, which represents a basic room structure in 3D. A tractable part could also be a circle, which may represent a pillar in 3D. FIGS. 6a-d illustrate one embodiment of a method of the invention for decomposing an input irregular footprint into tractable parts. First, according to building attributes (e.g., building type) and geometry complexity level, predefined procedural modelling rules may be applied to tractable parts to derive stylized 3D building components. Then after individual 3D building components are generated from the corresponding tractable part, they may be combined into one complete 3D structure for stylized visualization. Stylized procedural modeling may take the 2D footprint along with building attributes as input and may output a 3D building with stylized visualizations on-line. Decomposition may be first applied to the 2D footprint (FIG. 6a) to thereby arrive at a decomposition of the footprint (FIG. 6b). The resultant tractable parts (FIG. 6c) may be modeled separately. The final 3D building (FIG. 6d) may be the combination of all individual 3D components.

Figure 7B:
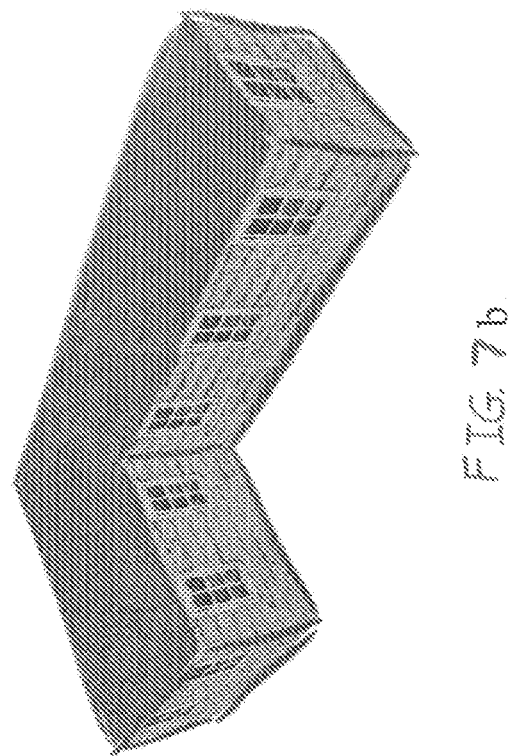
Figure 7A:
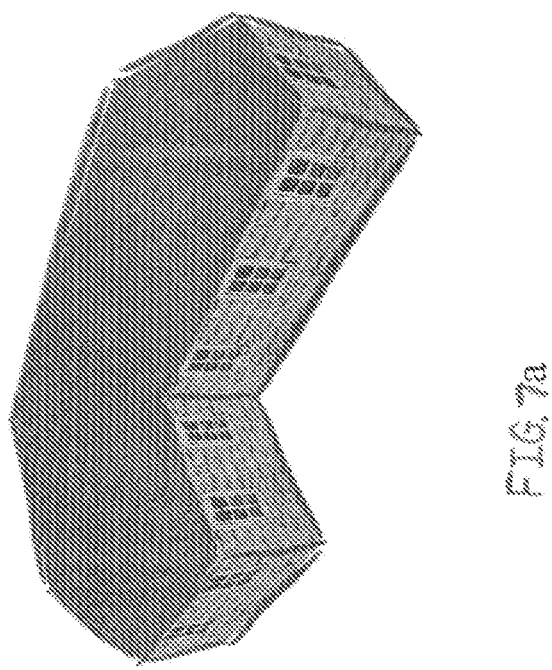
FIG. 7a is an example of adaptive stylized procedural modeling of a building according to a method of the present invention.

Yet another feature of the stylized procedural modelling of the present invention may be that the method is adaptive to accommodate real-time performance requirements of procedural modeling for large-scale scenes. The complexity level of resultant 3D buildings may be adjusted to achieve better run-time performance. FIGS. 7a and 7b are examples of adaptive stylized procedural modelling that illustrate the adjustability of the complexity level of resultant 3D buildings. More particularly, FIGS. 7a and 7b are two buildings of the same type generated from the same 2D footprint. The building of FIG. 7a has more complicated geometric structures for the roof as compared to the flat roof in FIG. 7b.

The complexity can increase when the current rendering speed, which may be expressed in frames per second (fps), is above the target number. Conversely, the complexity may decrease when the current rendering speed does not meet the speed requirement. A hierarchical set of procedural modelling rules (i.e., having different levels) may be predefined for tractable parts. Therefore, the geometric complexity of generated buildings may be controlled by changing the level for procedural modelling operations dynamically.

The present invention includes several novel features. First, the invention provides a novel approach to performing stylized procedural modeling on-line based on the input of a 2D footprint and attribute information of the building. Second, the invention provides an enhanced "3D icon"-like approach to visualize non-landmark buildings. Third, the invention provides a method of decomposing a 2D footprint into several tractable parts and combining each modeling result into one complex model. Fourth, the invention provides an adaptive procedural modeling method in which the geometric or appearance complexity of generated 3D buildings may be controlled to meet the target performance of the hardware platform.

Figure 8:
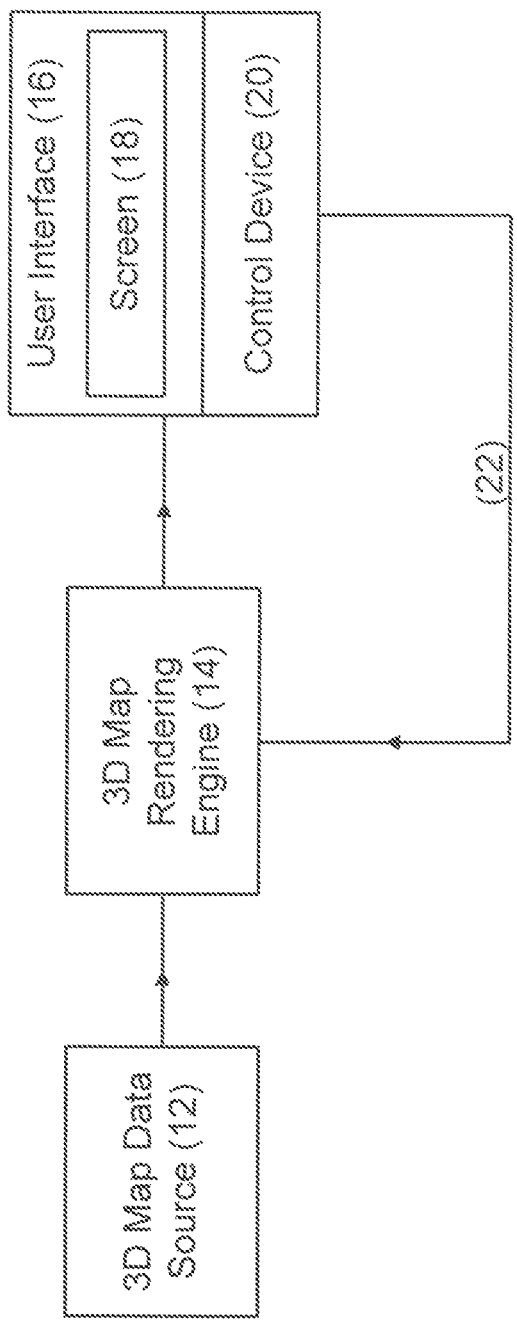
FIG. 8 is a block diagram of one embodiment of a 3D map rendering arrangement of the present invention.

In FIG. 8 there is shown one embodiment of a 3D map rendering arrangement 10 of the present invention that may be associated with a vehicle, such as an automobile. That is, arrangement 10 may be installed in-vehicle.

Arrangement 10 may include a source 12 of 3D map data, a 3D map rendering engine 14, and a user interface 16. 3D map data source 12 may be in the form of a compact disc (CD) or other memory device. Alternatively, 3D map data may be wirelessly transmitted by a central transmitter (not shown) to a large number of vehicles that each has a respective 3D map rendering arrangement 10. Such wireless transmissions may be received by engine 14. 3D map data could include both 3D and 2D data as long as the data is used for 3D map visualization.

3D map data source 12 may also include a global positioning system (GPS) module (not shown) for determining the global location coordinates of the vehicle in real time. Based on the current location of the vehicle, corresponding 3D map data that is of interest to people within the vehicle is identified and provided to engine 14. At least some of the 3D map data may be photorealistic in visual style.

3D map rendering engine 14 may include a standard electronic processor that converts the 3D map data from source 12 into image data. During the course of rendering, engine 14 may select certain 3D objects in the data based on criteria provided by the user and may render the selected 3D objects in highlighted or enhanced rendering style, as described above. In one embodiment, at least some of the highlighted image data may be in various nonphotorealistic styles, such as cartoon-like rendering, pencil sketches, pen-and-ink illustrations, oil painting effects, and other painterly styles. The nonphotorealistic renderings may depict surfaces of objects and distinctive or well-known features of the objects.

User interface 16 may be disposed on a dashboard of a vehicle and may include a display screen 18 and a control device 20. Display screen 18 may include a processor and memory for controlling the information or content that is displayed on the screen or monitor. Generally, display screen 18 may present or depict 3D data received from engine 14.

Control device 20 may be in the form of a dial, knob, set of pushbuttons, joystick, microphone, or any combination of the above. A user may use control device 20 to provide feedback 22 to engine 14. Feedback 22 may instruct engine 14 to produce another set of image data (e.g., image data depicting another scene, object or set of objects). Alternatively, feedback 22 may instruct engine 14 to change the viewing angle at which a current set of image data is being viewed. The viewing angle may vary from an overhead bird's-eye view of the surroundings to an angle looking up at buildings, or at other landmarks, from a ground level or street level.

Figure 9:
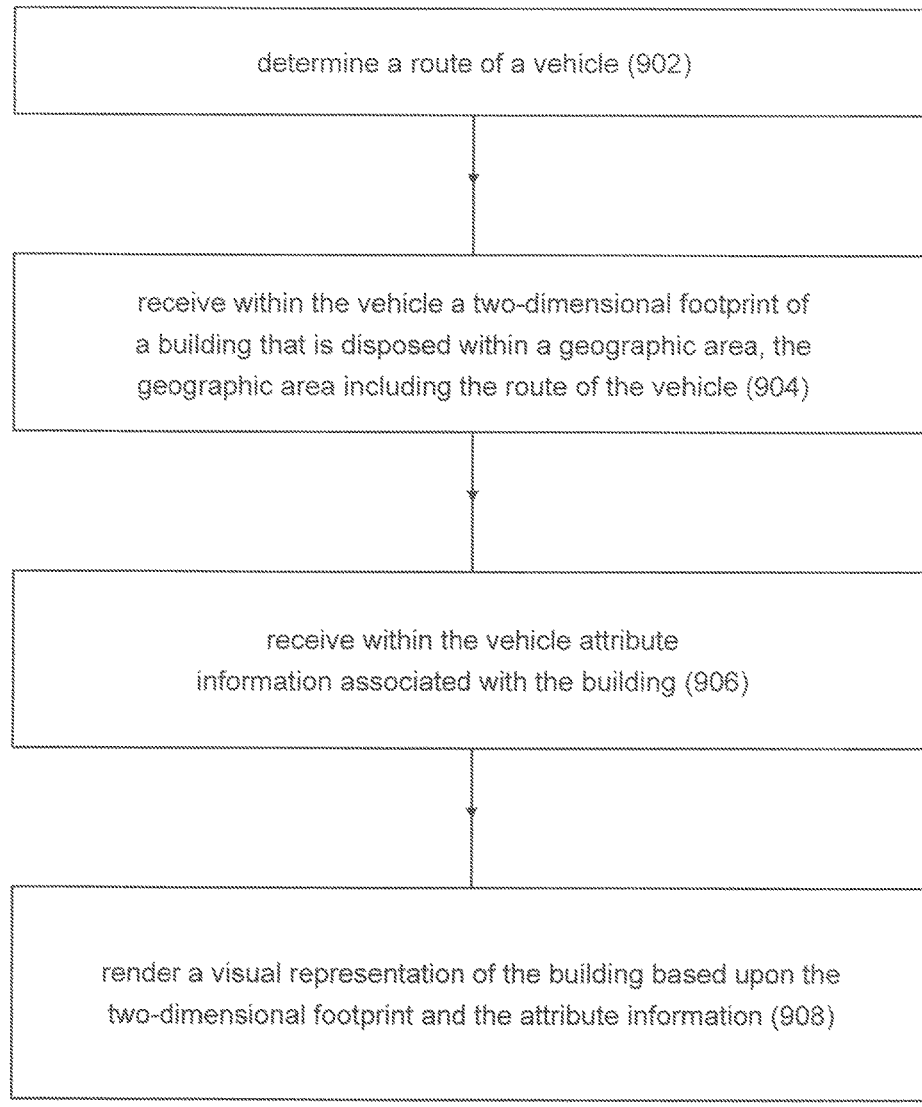
FIG. 9 is a flow chart of one embodiment of a method of the present invention for displaying a navigation map.

An embodiment of a method 900 of the present invention for displaying a navigation map is illustrated in FIG. 9. In a first step 902, a route of a vehicle is determined. For example, the arrangement of FIG. 8 may include a navigation system that automatically and continuously updates an optimum path or route from a vehicle's current location to a desired destination. A GPS or other location-determining device associated with the arrangement of FIG. 8 may ascertain and continuously update the current location of the vehicle, which may be expressed in global coordinates. The user inputs his desired destination into the system and the system automatically determines the shortest and/or quickest route from the current location to the destination location along the streets that are available.

In a next step 904, a two-dimensional footprint of a building that is disposed within a geographic area is received within the vehicle. The geographic area includes the route of the vehicle. For example, based on the vehicle's route determined in step 902, map data associated with the geographic area surrounding the route of the vehicle may be retrieved from a memory device, such as a CD. Alternatively, the map data associated with the geographic area surrounding the route of the vehicle may be wirelessly received from a central repository of map data. Regardless of how it is received, the map data may include 2D data describing the shape and dimensions of the bases (i.e., 2D footprints) of the buildings within the geographic area surrounding the route of the vehicle.

Next, in step 906, attribute information associated with the building is received within the vehicle. For example, the map data described with reference to step 904 may include building attribute information including the types and heights of each of the buildings within the geographic area surrounding the route of the vehicle.

In a final step 908, a visual representation of the building is rendered based upon the two-dimensional footprint and the attribute information. For example, a rendering of the building may have a footprint that is substantially similar in shape to the footprint of the actual building. Further, the rendering may have a height relative to the footprint dimensions that is proportional to the height versus footprint dimensions of the actual building. Further still, the rendering may include a color scheme and texturing that is designated for that particular type of building. For example, as described above with regard to FIGS. 5b-c, all buildings of the type "church" in Berlin may be rendered with the same greenish roofs and doors with cross-like decorations. As another example, all banks in the United States may be rendered with two white pillars to the left, and two white pillars to the right of a front door, with a "$" symbol disposed above the door. As yet another example, all primary-level schools disposed in the Midwestern states of the United States may be rendered in red brick with a school bell near the top of the building.

Figure 10:
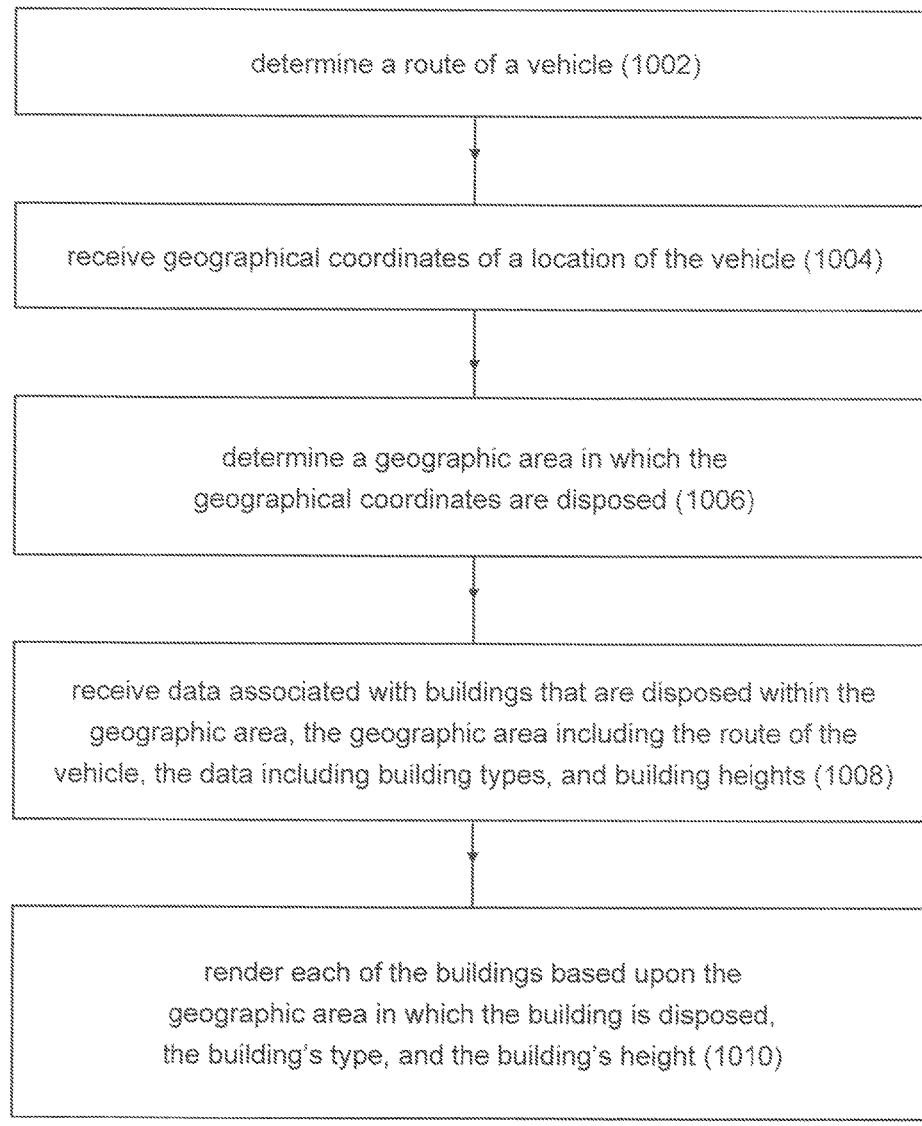
FIG. 10 is a flow chart of another embodiment of a method of the present invention for displaying a navigation map.

An embodiment of a method 1000 of the present invention for displaying a navigation map is illustrated in FIG. 10. In a first step 1002, a route of a vehicle is determined. In a next step 1004, geographical coordinates of a location of the vehicle are received. For example, a GPS or other location-determining device associated with the arrangement of FIG. 8 may ascertain and continuously update the current location of the vehicle, which may be expressed in global coordinates.

Next, in step 1006, a geographic area in which the geographic coordinates are disposed is determined. That is, a geographic area including the geographic coordinates and having consistent, or monolithic architecture for at least one certain type of building is determined. For example, as described above with respect to FIGS. 5b-c, a geographic area in the form of the city of Berlin is identified as having churches with a common architecture including greenish roofs and doors with cross-like decorations. As another example, a geographic area in the form of the United States may be identified as having banks with white pillars in the front of the building. As yet another example, a geographic area in the form of the Midwestern states of the United States may be identified as having primary-level schools built with red bricks.

In a next step 1008, data associated with buildings that are disposed within the geographic area is received. The geographic area includes the route of the vehicle. The data includes building types, 3D shapes, and building heights. For example, data associated with buildings in the geographic area including the route of the vehicle may be retrieved from a memory device, such as a CD. Alternatively, the data associated with buildings in the geographic area including the route of the vehicle may be wirelessly received from a central repository of map data. Regardless of how it is received, the data may include data describing the types and heights of the buildings within the geographic area including the route of the vehicle.

In a final step 1010, each of the buildings is rendered based upon the geographic area in which the building is disposed, the building's type, and the building's height. For example, the color scheme and/or texturing in which the buildings are rendered may depend upon the common architectural style for certain types of buildings within the geographic area. Further, the rendering may match the actual buildings' 3D shapes and heights such that the dimensions of the rendered buildings are proportional to the actual dimensions of the individual buildings. The 2D footprint plus height could determine the rough 3D shape of the building. For non-landmark buildings, the 3D shape/geometry is generated by the inventive algorithm. The 3D shape/geometry is not included in the data.

Figure 11:
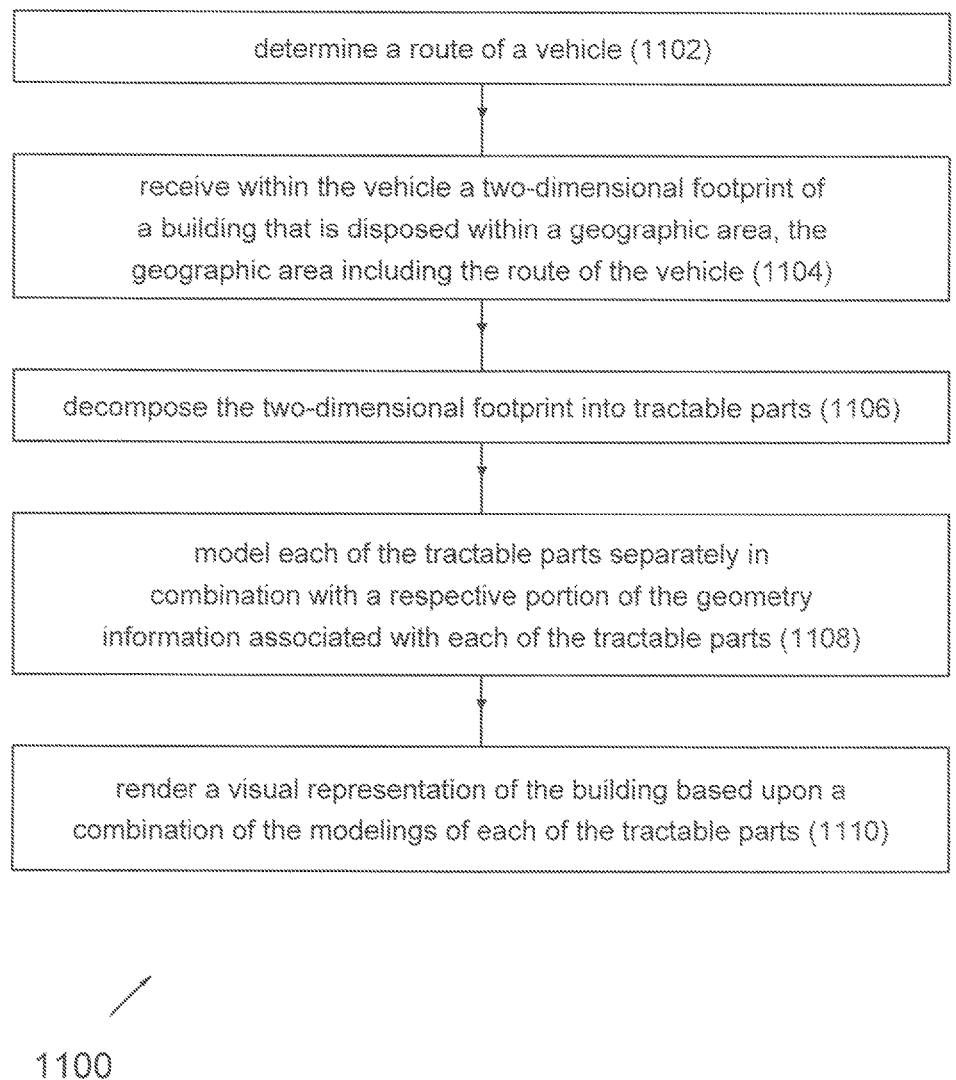
FIG. 11 is a flow chart of yet another embodiment of a method of the present invention for displaying a navigation map.

Yet another embodiment of a method 1100 of the present invention for displaying a navigation map is illustrated in FIG. 11. In a first step 1102, a route of a vehicle is determined. In a next step 1104, a two-dimensional footprint of a building that is disposed within a geographic area is received within the vehicle. The geographic area includes the route of the vehicle. Next, in step 1106, the two-dimensional footprint is decomposed into tractable parts. For example, the two-dimensional footprint shown in FIG. 6a may be decomposed into the three tractable parts indicated in FIG. 6b. In one embodiment, the tractable parts may be formed by adding bounding lines between corners of the footprint to thereby form quadrilateral parts, as is the case in FIG. 6b.

In a next step 1108, each of the tractable parts is modeled separately in combination with a respective portion of the geometry information associated with each of the tractable parts. For example, each of the three tractable parts of FIG. 6b may be modeled separately in combination with a respective portion of the geometry information of FIG. 6c that is disposed directly above the respective tractable part.

In a final step 1110, a visual representation of the building is rendered based upon a combination of the modelings of each of the tractable parts. That is, the three separate modelings, each including one of the three tractable parts of FIG. 6b along with the respective portion of the building geometry of FIG. 6c, may be combined to thereby render a stylized 3D visual representation of the building, as depicted in FIG. 6d.

While this invention has been described as having an exemplary design, the present invention may be further modified within the spirit and scope of this disclosure. This application is therefore intended to cover any variations, uses, or adaptations of the invention using its general principles.

What is claimed is:

1. A method of displaying a navigation map, comprising the steps of:
   determining a route of a vehicle;
   receiving within the vehicle a two-dimensional footprint of a building that is disposed within a geographic area, the geographic area including the route of the vehicle;
   receiving attribute information including a building type associated with the building, the attribute information being received within the vehicle;
   generating a three-dimensional graphical model including a geometric structure extending from the two-dimensional footprint, the geometric structure in the three-dimensional graphical model being generated with reference to the geographic area, the attribute information associated with the building, and a geometric complexity level corresponding to a hardware platform in the vehicle; and
   rendering a visual representation of the three-dimensional graphical model of the building, the rendering further comprising:
      identifying a color to be applied to a first portion of the three-dimensional graphical model based upon the type of the building and the geographic area in which the building is disposed;
      identifying a stylized texture decoration to be applied to a second portion of the three-dimensional graphical model based upon the type of the building and the geographic area in which the building is disposed, the second portion being different than the first portion; and
      rendering the visual representation with the color being applied to the first portion of the three-dimensional graphical model and the stylized texture decoration being applied to the second portion of the three-dimensional graphical model.

2. The method of claim 1, the generating of the three-dimensional graphical model further comprising:
   generating a three-dimensional roof geometry for the three-dimensional graphical model based on the building type and the geographic area.

3. A method of displaying a navigation map, comprising the steps of:
   determining a route of a vehicle;
   receiving within the vehicle a two-dimensional footprint of a building that is disposed within a geographic area, the geographic area including the route of the vehicle;
   receiving within the vehicle attribute information including a building type associated with the building;
   decomposing the two-dimensional footprint into tractable parts;
   generating a plurality of geometric structures, each geometric structure extending from one of the tractable parts; and
   rendering a three-dimensional model of the building based upon a combination of the plurality of geometric structures corresponding to each of the tractable parts, the rendering further comprising:
      identifying a color to be applied to a first geometric structure in the plurality of geometric structures of the three-dimensional graphical model based upon the type of the building and the geographic area in which the building is disposed;
      identifying a stylized texture decoration to be applied to a second geometric structure in the plurality of geometric structures of the three-dimensional graphical model based upon the type of the building and the geographic area in which the building is disposed, the second geometric structure being different than the first geometric structure; and
      rendering the visual representation with the color being applied to the first geometric structure in the plurality of geometric structures in the three-dimensional graphical model and the stylized texture decoration being applied to the second geometric structure in the plurality of geometric structures in the three-dimensional graphical model.

4. The method of claim 3 comprising the further steps of:
   determining a target performance level of a hardware platform within the vehicle; and
   controlling the geometric complexity of the plurality of geometric structures that are generated for the three-dimensional model of the building in order to meet the target performance level.

5. The method of claim 4 further comprising:
   generating a plurality of three-dimensional models corresponding to a plurality of buildings having the type of the building; and
   applying the color and the stylized texture decoration to the plurality of geometric structures in each of the plurality of three-dimensional models for the plurality of buildings.

6. The method of claim 3, the generating of the plurality of geometric structures further comprising:
   generating a three-dimensional geometric structure corresponding to a roof geometry for the three-dimensional model based on the building type and the geographic area.

7. The method of claim 3 further comprising:
   decomposing the two-dimensional footprint into tractable parts including at least one convex quadrilateral and at least one circle;
   generating the plurality of geometric structures including a basic room structure corresponding to the convex quadrilateral and a pillar corresponding to the at least one circle.

\* \* \* \* \*